(12) United States Patent
Edwards et al.

(10) Patent No.: US 10,140,154 B2
(45) Date of Patent: Nov. 27, 2018

(54) WORKLOAD SCHEDULING AUTOMATION UTILITY

(71) Applicant: BANK OF AMERICA CORPORATION, Charlotte, NC (US)

(72) Inventors: Christopher Edwards, Weston, CT (US); Raja SVB Balabhadruni, Telangana (IN); Veera Busani, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 131 days.

(21) Appl. No.: 15/299,006

(22) Filed: Oct. 20, 2016

(65) Prior Publication Data
US 2018/0113741 A1   Apr. 26, 2018

(51) Int. Cl.
G06F 9/46   (2006.01)
G06F 9/50   (2006.01)
G06F 9/48   (2006.01)

(52) U.S. Cl.
CPC .............. *G06F 9/5005* (2013.01); *G06F 9/48* (2013.01)

(58) Field of Classification Search
CPC .................................. G06F 9/5005; G06F 9/48
See application file for complete search history.

(56) References Cited

U.S. PATENT DOCUMENTS 5,920,700 A * 7/1999 Gordon ................. G06F 3/0607
  709/226
6,938,256 B2 * 8/2005 Deng .................... G06F 9/5044
  718/104

* cited by examiner

*Primary Examiner* — Camquy Truong
(74) *Attorney, Agent, or Firm* — Michael A. Springs

(57) ABSTRACT

A computer resource allocation tool includes an interface, a first memory, a processor, and a second memory. The interface receives a request for an information report, the information report comprising a summary of one or more datasets. The interface receives a first dataset for processing, wherein the processing generates, at least in part, the information report and wherein in the processing consumes computer resources of a computer system. The first memory stores the first dataset. The processor extracts first input data from the first dataset, the first input data comprises parameters for processing the first dataset to produce the information report. The second memory stores the first input data, wherein the second memory is different from the first memory. The processor further determines. an amount of computer resources required to process the first dataset based on, at least in part, the first dataset and the first input data. The processor determines a computer resource availability for the computer system for each time window of a plurality time windows. The processor generates first scheduling information based on the amount of computer resources required to process the first dataset and the computer resource availability for one or more time windows, the first scheduling information indicating whether the computer system has the computer resource availability to process the first dataset during the one or more time windows. The processor generates a scheduling report based on the first scheduling information, the scheduling report indicating the one or more time windows to process the first dataset. The interface communicates the scheduling report.

20 Claims, 4 Drawing Sheets

WORKLOAD SCHEDULING AUTOMATION UTILITY

TECHNICAL FIELD

This disclosure relates generally to the automation and scheduling of computer resources.

BACKGROUND

Computer systems may process a plurality of datasets. A computer system may have limited resources such that each dataset may not be processed concurrently due to computer resource limitations such as processing and memory limitation.

SUMMARY OF THE DISCLOSURE

According to an embodiment, a computer resource allocation tool includes an interface, a first memory, a processor, and a second memory. The interface receives a request for an information report, the information report comprising a summary of one or more datasets. The interface receives a first dataset for processing, wherein the processing generates, at least in part, the information report and wherein in the processing consumes computer resources of a computer system. The first memory stores the first dataset. The processor extracts first input data from the first dataset, the first input data comprises parameters for processing the first dataset to produce the information report. The second memory stores the first input data, wherein the second memory is different from the first memory. The processor further determines. an amount of computer resources required to process the first dataset based on, at least in part, the first dataset and the first input data. The processor determines a computer resource availability for the computer system for each time window of a plurality time windows. The processor generates first scheduling information based on the amount of computer resources required to process the first dataset and the computer resource availability for one or more time windows, the first scheduling information indicating whether the computer system has the computer resource availability to process the first dataset during the one or more time windows. The processor generates a scheduling report based on the first scheduling information, the scheduling report indicating the one or more time windows to process the first dataset. The interface communicates the scheduling report.

According to another embodiment, a method includes receiving, through an interface, a request for an information report, the information report comprising a summary of one or more datasets. The method also includes receiving, through the interface, a first dataset for processing, wherein the processing generates, at least in part, the information report and wherein in the processing consumes computer resources of a computer system. The method further includes storing, in a first memory, the first dataset. The method also includes extracting, using a processor, first input data from the first dataset, the first input data comprises parameters for processing the first dataset to produce the information report. The method further includes storing, in a second memory, the first input data, wherein the second memory is different from the first memory. The method further includes determining, using the processor, an amount of computer resources required to process the first dataset based on, at least in part, the first dataset and the first input data. The method further includes determining, using the processor, a computer resource availability for the computer system for each time window of a plurality time windows. The method further includes generating, using the processor, first scheduling information based on the amount of computer resources required to process the first dataset and the computer resource availability for one or more time windows, the first scheduling information indicating whether the computer system has the computer resource availability to process the first dataset during the one or more time windows. The method further includes generating, using the processor, a scheduling report based on the first scheduling information, the scheduling report indicating the one or more time windows to process the first dataset. The method further includes communicating, through the interface, the scheduling report.

According to yet another embodiment, a system includes a database and a computer resource allocation tool. The computer resource allocation tool receives a request for an information report, the information report comprising a summary of one or more datasets. The computer resource allocation tool receives a first dataset for processing from the database, wherein the processing generates, at least in part, the information report and wherein in the processing consumes computer resources of a computer system. The computer resource allocation tool stores the first dataset. The computer resource allocation tool extracts first input data from the first dataset, the first input data comprises parameters for processing the first dataset to produce the information report. The computer resource allocation tool stores the first input data, wherein the second memory is different from the first memory. The computer resource allocation tool determines an amount of computer resources required to process the first dataset based on, at least in part, the first dataset and the first input data. The computer resource allocation tool determines a computer resource availability for the computer system for each time window of a plurality time windows. The computer resource allocation tool generates first scheduling information based on the amount of computer resources required to process the first dataset and the computer resource availability for one or more time windows, the first scheduling information indicating whether the computer system has the computer resource availability to process the first dataset during the one or more time windows. The computer resource allocation tool generates a scheduling report based on the first scheduling information, the scheduling report indicating the one or more time windows to process the first dataset. The computer resource allocation tool communicates the scheduling report.

Certain embodiments provide one or more technical advantages. For example, an embodiment improves the speed at which processors and memory process data. As another example, an embodiment prevents overburdening a computer system's limited computer resources while still completing data processing. As yet another example, an embodiment maximizes computer processing resources by processing data when a computer system has the most available computer resources for data processing. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Processing data consumes computer resources. In certain instances, enterprises may break up processing of a large volume of data into smaller data segments and process multiple data segments in parallel.

Computer resources may be limited. For example, processor, memory, storage, and/or bandwidth may all be limited. Because processing data segments consumes computer resources, there may be capacity to execute only a limited number of processes at any particular time. In some instances, schedules may be established to coordinate such processing.

With large volumes of data, a large number of atomic workload processing schedules may be necessary. A large number of workload processing schedules may increase the likelihood of errors in these schedules. Errors in workload processing schedules may result in delays and increased processor and memory usage. For example, errors in scheduling may lead to processing too many data segments at a particular time. In this case, there may not be enough computer resources at a particular time, and data processing may not complete.

This disclosure contemplates a computer resource allocation tool that automatically generates schedule specifications based on, at least in part, scheduling inputs. For example, the computer resource allocation tool may determine the amount of computer resources required to process a data segment and determine a period of time to begin processing the data segment without overburdening a system. The scheduling specifications may be automatically propagated to a scheduling system. In particular embodiments, the computer resource allocation tool efficiently controls the processing scheduling and workloads within a time window. In an embodiment, the computer resource allocation tool reduces the opportunity for human error through keying issues by automatically preparing workload schedules with limited input from a user.

Figure 1:
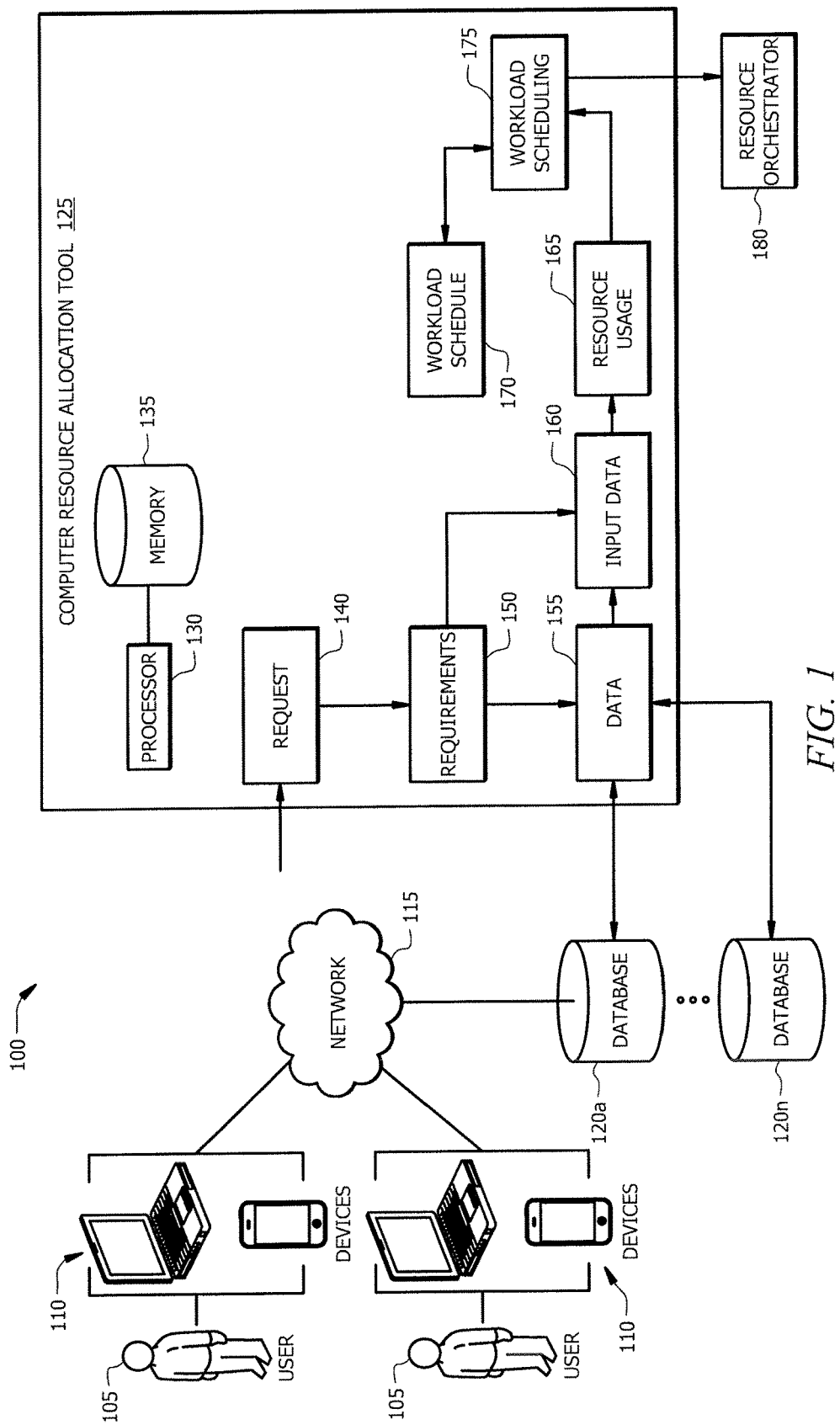
FIG. 1 illustrates a system for computer resource allocation.
Figure 2:
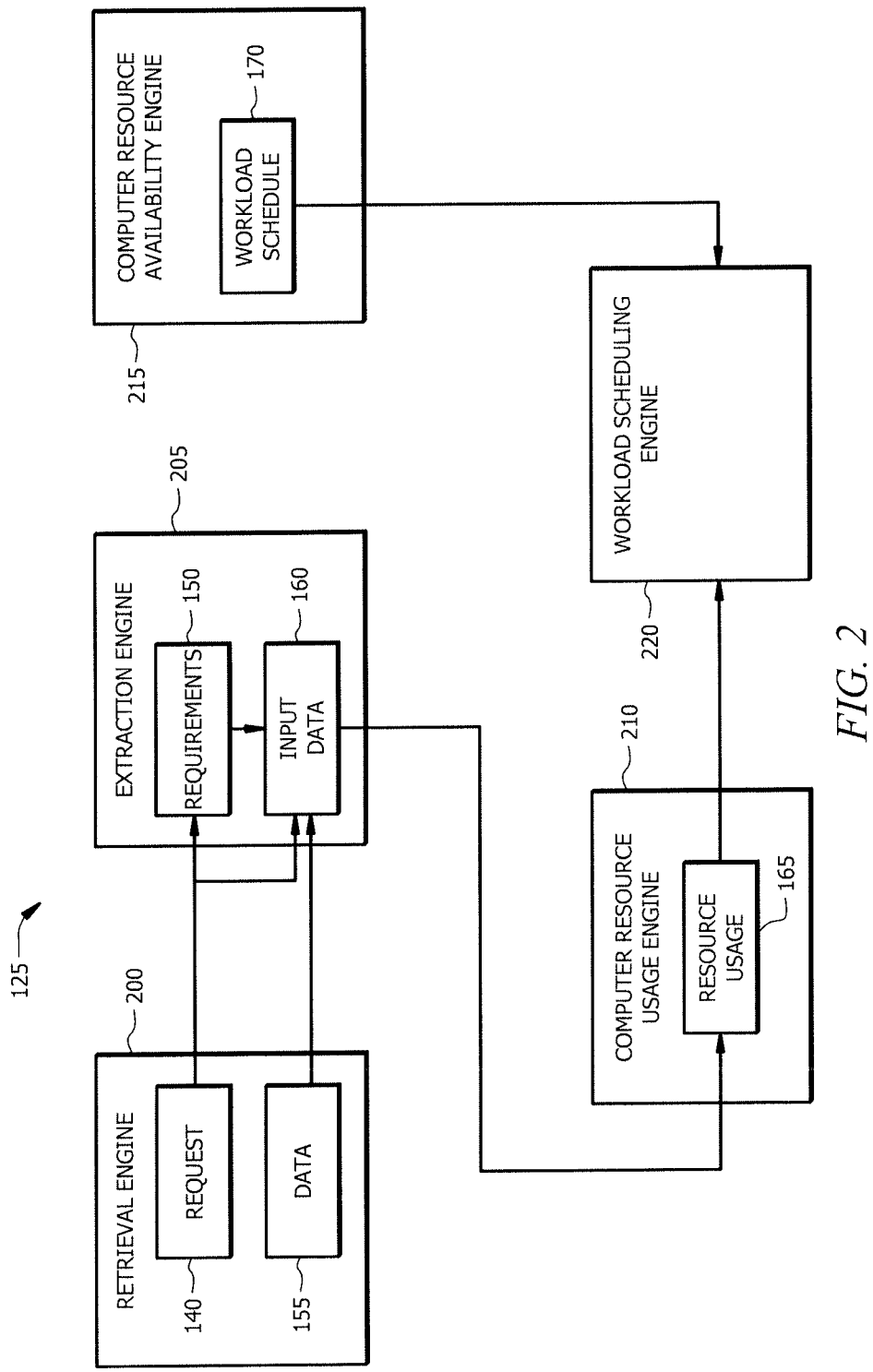
FIG. 2 illustrates the computer resource allocation tool of the system of FIG. 1.
Figure 3:
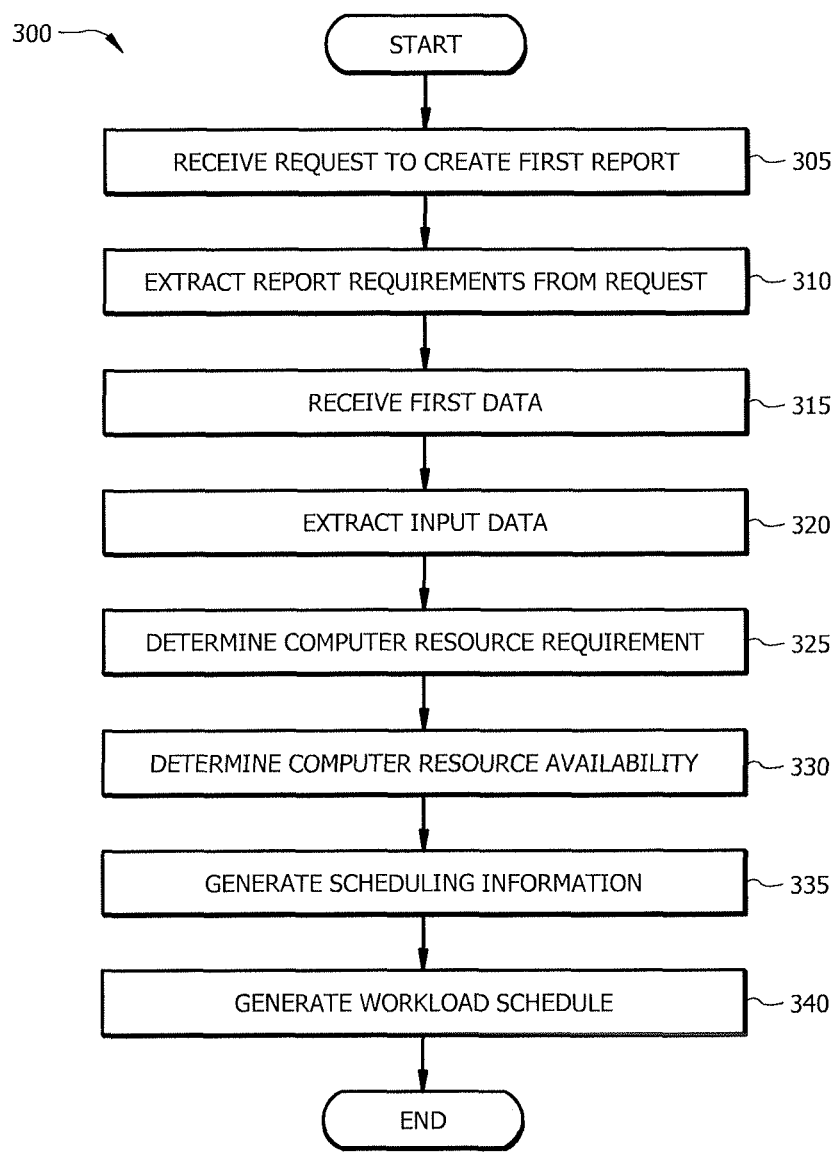
FIG. 3 is a flowchart illustrating a method for creating a workload schedule using the system of FIG. 1.
Figure 4:
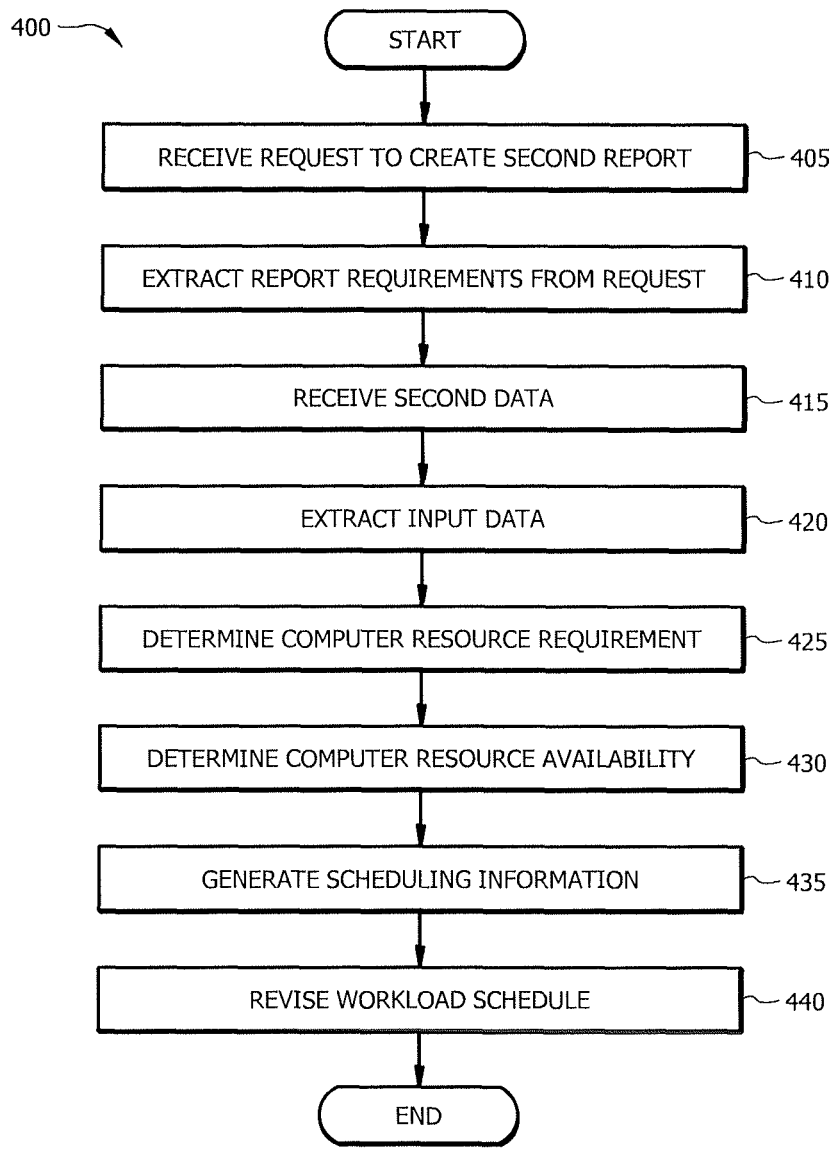
FIG. 4 is a flowchart illustrating a method for revising a workload schedule using the system of FIG. 1.

The computer resource allocation tool will be described in more detail using FIGS. 1 through 4. FIG. 1 will describe the computer resource allocation tool generally. FIGS. 2 through 4 will describe the computer resource allocation tool in more detail.

FIG. 1 illustrates a system 100 for creating a workload processing schedule. As illustrated in FIG. 1, system 100 includes one more devices 110, a network 115, databases 120a-n, and computer resource allocation tool 125. In particular embodiments, system 100 reduces the number of errors in processing large volumes of data by ensuring that sufficient computer resources are available to process the data.

Devices 110 may be any devices that operate and/or communicate with other components of system 100. In general, devices 110 request and receive processed data. For example, devices 110 communicate a request to process data to computer resource allocation tool 125 or any other suitable component of system 100. Devices 110 may be associated with an enterprise or a business unit within an enterprise. Devices 110 and/or their associated enterprises may consume processed data. For example, the processed data may be used to provide to decision-making systems and/or to comply with regulatory reporting.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 comprises databases 120a-n, where n represents any suitable number. For example, system 100 may comprise a single database 120 or any number of databases 120. Databases 120 store data to be processed. For example, databases 120 may store consumer retail account data for a financial services company. This disclosure does not limit the databases 120 to storing only consumer retail account data. This disclosure contemplates databases 120 storing any suitable data type. For example, databases 120 may store any type of data to be processed.

Computer resource allocation tool 125 generates workload processing schedules for processing data stored in databases 120. As illustrated in FIG. 1, computer resource allocation tool 125 includes a processor 130 and memory 135. This disclosure contemplates processor 130 and memory 135 being configured to perform any of the operations of computer resource allocation tool 125 described herein. In particular embodiments, computer resource allocation tool 125 reduces the number of errors when processing large volumes of data according to schedules.

Processor 130 is any electronic circuitry, including, but not limited to microprocessors, application specific integrated circuits (ASIC), application specific instruction set processor (ASIP), and/or state machines, that communicatively couples to memory 135 and controls the operation of computer resource allocation tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory 135 and executes them by directing the coordinated operations of the ALU, registers and other components. Processor 130 may include other hardware and software that operates to control and process information. Processor 130 executes software stored on memory 135 to perform any of the functions described herein. Processor 130 controls the operation and administration of computer resource allocation tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 may store data 155 and workload schedule 170. This disclosure contemplates memory 135 storing any of the elements stored in databases 120 and/or by computer resource allocation tool 125.

Resource orchestrator 180 generally receives workload schedules and orchestrates data processing based on the workload schedules. Computer resource allocation tool 125 may communicate a workload schedule to resource orchestrator 180 via network 115. Resource orchestrator 180 may prepare one or more data processing machines based on a received workload schedule. For example, resource orchestrator 180 may communicate instructions to one or more servers to prepare the servers to complete data processing based on a workload schedule. In particular embodiments, a workload schedule indicates to perform data processing using a plurality of machines. Resource orchestrator 180 receives the workload schedule and prepares the machines for data processing. For example, resource orchestrator 180 may communicate to the machines which data segments to process and/or when to process the data. As illustrated, resource orchestrator 180 is located external to computer resource allocation tool 125. Resource orchestrator may be located within one or more devices 110, one or more databases 120, computer resource allocation tool 125, and/or any other suitable component of system 100.

In an exemplary embodiment, computer resource allocation tool 125 receives a request 140. Request 140 may indicate a request for processed data. Request 140 may indicate a request for a report of data stored in databases 120. For example, request 140 may comprise a request for the account numbers, balance information, and location of all customer accounts closed in the previous day. Request 140 may be sent by one or more devices 110.

Computer resource allocation tool 125 may analyze request 140 to determine requirements 150. Requirements 150 may indicate the type of information to be processed, the format of the processed data, the timeframe that the data must be processed, and/or the machines that should process the data.

In response to receiving request 140 and determining requirements 150, computer resource allocation tool 125 may retrieve data 155 from database 120. Generally, data 155 is data that requires processing to complete request 140. For example, in the embodiment where the request is for the account numbers, balance information, and location of all customer accounts closed in the previous day, data 155 may contain the data for each customer account.

Computer resource allocation tool 125 may extract input data 160 from data 155 and/or requirements 150. Generally, input data 160 is data that facilitates determining the amount of computer resources required to perform a data processing task. For example, input data 160 may indicate the start time for a particular data processing job, the name of a data processing job, input parameters for a data processing job, and/or the machine(s) used to complete the data processing job. In an embodiment, the input parameters for a data processing job facilitate decision-making processes. For example, in an embodiment where the decision is whether to offer relationship-based pricing, the input parameters may comprise prevailing interest rates, competitor interest rates, the size and spread of customer account balances, and/or propensity to retain business. In an embodiment, input data 160 is stored in a database. Input data 160 may be stored in the same database as data 155 or a different database from data 155.

Computer resource allocation tool 125 may determine resource usage 165. Resource usage 165 generally indicates the amount of computer resources required to complete a data processing job. There may be a limited amount of computers resources available for data processing. For example, there may be a limited amount of processing, memory, storage, bandwidth, and/or network capacity. Resource usage 165 may indicate the amount of processing, memory, storage, and/or bandwidth required to complete a data processing job. A data processing job may comprise processing all of the data required to respond to a request 140. As another example, a data processing job may be processing a segment of data required to respond to a request 140. In an embodiment, resource usage 165 may be determined through testing. For example, in a project lifecycle, a designed program may be tested to determine its consumption of resources. The testing results, input data 160, data 155, and/or 150, may indicate the amount of computer resources required to process data 155 or a segment of data 155.

Computer resource allocation tool 125 may comprise a workload schedule 170. Generally, workload schedule 170 indicates the time window that systems are completing other data processing jobs. Workload schedule 170 may further indicate the amount of computer resources required to complete the other data processing jobs. In an embodiment, workload schedule 170 may indicate the machines that process jobs. Workload schedule may be stored in memory 135 or any other suitable component of system 100.

Computer resource allocation tool 125 completes workload scheduling 175. Generally, workload scheduling 175 indicates when and/or on what machine(s) a data processing job should be executed. Workload scheduling 175 may be determined using resource usage 165, workload schedule 170, and/or any other suitable data input.

Modifications, additions, or omissions may be made to system 100 without departing from the scope of the invention. For example, system 210 may include any number of processors 130, memory 135, devices 110, and/or databases 120. Furthermore, the components of system 100 may be integrated or separated. For example, in particular implementations, memory 135 may be separated into multiple memories 135 to store the data descried herein.

FIG. 2 illustrates the computer resource allocation tool 125 of the system 100 of FIG. 1. As illustrated in FIG. 2, computer resource allocation tool 125 includes retrieval engine 200, extraction engine 205, computer resource usage engine 210, computer resource availability engine 215, and workload scheduling engine 220. In particular embodiments, computer resource allocation tool reduces the number of errors in processing large volumes of data by ensuring that sufficient computer resources are available to process the data.

Retrieval engine 200 receives request 140 and data 155. In particular embodiments, retrieval engine 200 receives request 140 from one or more devices 110. Retrieval engine 200 receives data 155 from databases 120. As discussed previously, data 155 may be data that is processed to complete a data processing job. An example algorithm for retrieval engine 200 is as follows: wait for request 140; receive request 140 from one or more devices 110; in response to receiving request 140, retrieve data 155 from database 120; receive data 155; send request 140 and data 155 to extraction engine 205.

Extraction engine 205 extracts requirements 150 from request 140. Extraction engine 205 may further extract input data 160 from request 140 and/or data 155. Requirements 150 may indicate the type of information to be processed, the format of the processed data, the timeframe that the data must be processed, and/or the machines that should process the data. An example algorithm for extraction engine 205 to extract requirements 150 is as follows: receive notification from retrieval engine 200 that request 140 has been received; analyze request 140 to determine requirements 150.

Extraction engine 205 may further extract input data 160 from request 140 and/or data 155. Generally, input data 160 is data that facilitates determining the amount of computer resources required to perform a data processing task. For example, input data 160 may indicate the start time for a particular data processing job to being, the name of a data processing job, input parameters for a data processing job, and/or the machine(s) used to complete the data processing job. In an embodiment, the input parameters for a data processing job facilitate decision-making processes. For example, in an embodiment where the decision is whether to offer relationship-based pricing, the input parameters may comprise prevailing interest rates, competitor interest rates, the size and spread of customer account balances, and/or propensity to retain business. An example algorithm for extraction engine 205 is as follows: receive notification from retrieval engine 200 that request 140 and/or data 155 has been received; analyze request 140 to determine requirements 150; determine whether to analyze data 155 to determine additional input data 160; upon a determination to analyze data 155, analyze data 155 to determine additional input data.

Computer resource usage engine 210 generates resource usage 165 from requirements 150 and/or input data 160. Resource usage 165 generally indicates the amount of computer resources required to complete a data processing job. An enterprise may have a limited amount of computers resources available for data processing. For example, an enterprise may a limited amount of processing, memory, storage, bandwidth, and/or network capacity. Resource usage 165 may indicate the amount of processing, memory, storage, bandwidth, and/or network capacity required to complete a data processing job. A data processing job may comprise processing all of the data required to respond to a request 140. As another example, a data processing job may be processing a segment of data required to respond to a request 140. An example algorithm for computer resource usage engine 210 is as follows: receive indication from extraction engine 205 that requirements 150 and/or input data 160 has been extracted; wait for input data 160; receive input data 160 from extraction engine 205; analyze input data 160 to determine whether to analyze requirements 150; upon a determine to analyze requirements 150, analyze requirements 150; determine resource usage 165 using the analysis of input data 160 and/or requirements 150.

Computer resource availability engine 215 communicates workload schedule 170 to workload scheduling engine 220. workload schedule 170 indicates the time window that systems within an enterprise are completing other data processing jobs. Workload schedule 170 may further indicate the amount of computer resources required to complete the other data processing jobs. In an embodiment, workload schedule 170 may indicate the machines that the enterprises use to complete the other processing jobs. Computer resource availability engine 215 may further receive and store a revised workload schedule 170. An example algorithm for computer resource availability engine 215 is as follows: receive a request for workload schedule 170 from workload scheduling engine 220; communicate workload schedule 170 to workload scheduling engine 220; receive revised workload schedule 170; store revised workload schedule 170.

Workload scheduling engine 220 schedules workload processing time(s) for completing data processing required to complete request 140. As described, enterprises may have limited computer resources and must schedule data processing jobs at particular times to avoid overburdening the enterprises systems while meeting required deadlines for data processing. Workload scheduling engine 220 may analyze workload schedule 170 to determine computer resource availability during one or more time windows. Workload scheduling engine 220 may further analyze resource usage 165 to determine the required computer resources to complete a particular data processing job. Workload scheduling engine 220 may schedule a data processing job.

In particular embodiments, workload scheduling engine 220 may determine a time window to process all or a segment of data 155 that will not overburden an enterprise's computer resources while still meeting data processing deadlines. In an embodiment, workload scheduling engine 220 may determine that a data processing job may not be completed in a particular time frame given the available amount of computer resources. In this embodiment, workload scheduling engine 220 may communicate an error to one or more devices 110 or any other suitable component of system 100. An example algorithm for workload scheduling engine 220 is as follows: wait for resource usage 165; receive resource usage 165 from computer usage engine 210; request workload schedule 170; receive workload schedule 170 from computer resource availability engine 215; determine time window to complete data processing; revise workload schedule 170 to include the new data processing job and time window; communicate revised workload schedule 170 to computer resource availability engine 215.

In some embodiments, workload scheduling engine 220 may not receive workload schedule 170. For example, if no other data processing jobs are scheduled, computer resource availability engine 215 may not comprise workload schedule 170. In these embodiments, workload scheduling engine 220 may create a workload schedule 170, the workload schedule 170 indicating the new data processing job. Workload scheduling engine 220 may communicate the newly created workload schedule 170 to computer resource availability engine 215 for storage. In particular embodiments, computer resource allocation tool 125 communicates workload schedule 170 to resource orchestrator 180.

FIG. 3 is a flowchart illustrating a method 300 for creating a workload schedule 170 using the system 100 of FIG. 1. In particular embodiments, computer resource allocation tool 125 performs method 300. By performing method 300, computer resource allocation tool 125 reduces the number of errors in processing large volumes of data by ensuring that sufficient computer resources are available to process the data.

Computer resource allocation tool 125 begins by receiving a request to create a report 140 in step 305. In step 310, computer resource allocation tool 125 extracts requirements 150 from request 140. Computer resource allocation tool 125 receives data 155 in step 315 and extracts input data 160 from requirements 150 and/or data 155 in step 320.

In step 325, computer resource allocation tool 125 determines the computer resource requirements to complete request 140 or a segment of request 140. Computer resource allocation tool 125 determines resources availability in step 330. Computer resource allocation tool 125 utilizes the resource requirements and/or the resource availability to generate scheduling information in step 335. For example, scheduling information may indicate at what time and/or on which machine a processing job should commence. Computer resource allocation tool 125 generates a workload schedule 170 at step 340. For example, computer resource allocation tool 125 may generate workload schedule 170 using the scheduling information generated at step 335. Resource allocation tool 125 may communicate workload schedule 170 to resource orchestrator 180 before the method ends.

Modifications, additions, or omissions may be made to method 300 depicted in FIG. 3. Method 300 may include more, fewer, or other steps. For example, steps may be performed in parallel or in any suitable order. While discussed as computer resource allocation tool 125 performing the steps, any suitable component of system 100, such as device(s) 110 for example, may perform one or more steps of the method.

FIG. 4 is a flowchart illustrating a method 400 for revising a workload schedule 170 using the system 100 of FIG. 1. In particular embodiments, computer resource allocation tool 125 performs method 400. By performing method 400, computer resource allocation tool 125 improves the efficiency and accuracy of revising workload schedules.

Computer resource allocation tool 125 begins by receiving a request to create a report 140 in step 405. In step 410, computer resource allocation tool 125 extracts requirements 150 from request 140. Computer resource allocation tool 125 receives data 155 in step 415 and extracts input data 160 from requirements 150 and/or data 155 in step 420.

In step 425, computer resource allocation tool 125 determines the computer resource requirements to complete request 140 or a segment of request 140. Computer resource allocation tool 125 determines resources availability in step 430. Computer resource allocation tool 125 utilizes the resource requirements and/or the resource availability to generate scheduling information in step 435. For example, scheduling information may indicate at what time and/or on which machine a processing job should commence. Computer resource allocation tool 125 revises workload schedule 170 at step 440. For example, computer resource allocation tool 125 may revise workload schedule 170 to add the scheduling information 435 to the workload schedule 170. Resource allocation tool 125 may communicate workload schedule 170 to resource orchestrator 180 before the method ends.

Modifications, additions, or omissions may be made to method 400 depicted in FIG. 4. Method 400 may include more, fewer, or other steps. For example, steps may be performed in parallel or in any suitable order. While discussed as computer resource allocation tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A computer resource allocation tool comprising:
an interface configured to:
receive a request for an information report, the information report comprising a summary of one or more datasets; and
receive a first dataset for processing, wherein the processing generates, at least in part, the information report and wherein in the processing consumes computer resources of a computer system;
a first memory configured to store the first dataset;
a processor configured to extract first input data from the first dataset, the first input data comprising parameters for processing the first dataset to produce the information report;
a second memory configured to store the first input data, wherein the second memory is different from the first memory;
the processor further configured to:
determine an amount of computer resources required to process the first dataset based on, at least in part, the first dataset and the first input data;
determine a computer resource availability for the computer system for each time window of a plurality time windows;
generate first scheduling information based on the amount of computer resources required to process the first dataset and the computer resource availability for one or more time windows, the first scheduling information indicating whether the computer system has the computer resource availability to process the first dataset during the one or more time windows; and
generate a scheduling report based on the first scheduling information, the scheduling report indicating the one or more time windows to process the first dataset; and
the interface further operable to communicate the scheduling report.

2. The computer resource allocation tool of claim 1, further comprising:
the interface further configured to receive a second dataset;

the processor further configured to:
   determine an amount of computer resources required to process the second dataset;
   determine the computer resource availability for the computer system for each of the plurality of time windows, wherein the determination is based on, at least in part, the first scheduling information; and
   generate second scheduling information based on the amount of computer resources required to process the second dataset and the computer resource availability of one or more time windows, the second scheduling information indicating whether the computer system has the computer resource availability to process the second dataset during one or more time windows; and
   update the scheduling report based on the second scheduling information.

3. The computer resource allocation tool of claim 2, wherein the scheduling report indicates to process first dataset and the second dataset in parallel.

4. The computer resource allocation tool of claim 1, wherein the first input data further comprises one or more of a name of the processing operation and a machine to complete data processing.

5. The computer resource allocation tool of claim 1, wherein determining the computer resources required to process the first dataset is determined through testing, the testing comprising executing data processing on one or more datasets.

6. The computer resource allocation tool of claim 1, wherein the information report is a pricing decision report and the first input data further comprises prevailing interest rates, competitor interest rates, size of account balances, and spread of account balances.

7. The computer resource allocation tool of claim 1, wherein the computer resources comprise storage availability, memory availability, network availability, and processing availability.

8. The computer resource allocation tool of claim 1, wherein information report is a regulatory reporting report.

9. A method comprising:
   receiving, through an interface, a request for an information report, the information report comprising a summary of one or more datasets;
   receiving, through the interface, a first dataset for processing, wherein the processing generates, at least in part, the information report and wherein in the processing consumes computer resources of a computer system;
   storing, in a first memory, the first dataset;
   extracting, using a processor, first input data from the first dataset, the first input data comprises parameters for processing the first dataset to produce the information report;
   storing, in a second memory, the first input data, wherein the second memory is different from the first memory;
   determining, using the processor, an amount of computer resources required to process the first dataset based on, at least in part, the first dataset and the first input data;
   determining, using the processor, a computer resource availability for the computer system for each time window of a plurality time windows;
   generating, using the processor, first scheduling information based on the amount of computer resources required to process the first dataset and the computer resource availability for one or more time windows, the first scheduling information indicating whether the computer system has the computer resource availability to process the first dataset during the one or more time windows;
   generating, using the processor, a scheduling report based on the first scheduling information, the scheduling report indicating the one or more time windows to process the first dataset; and
   communicating, through the interface, the scheduling report.

10. The method of claim 9, further comprising:
    receiving, through the interface, a second dataset;
    determining, using the processor, an amount of computer resources required to process the second dataset;
    determining, using the processor, the computer resource availability for the computer system for each of the plurality of time windows, wherein the determination is based on, at least in part, the first scheduling information;
    generating, using the processor, second scheduling information based on the amount of computer resources required to process the second dataset and the computer resource availability of one or more time windows, the second scheduling information indicating whether the computer system has the computer resource availability to process the second dataset during one or more time windows; and
    updating, using the processor, the scheduling report based on the second scheduling information.

11. The method of claim 10, wherein the scheduling report indicates to process first dataset and the second dataset in parallel.

12. The method of claim 9, wherein the first input data further comprises one or more of a name of the processing operation and a machine to complete data processing.

13. The method of claim 9, wherein determining the computer resources required to process the first dataset is determined through testing, the testing comprising executing data processing on one or more datasets.

14. The method of claim 9, wherein the information report is a pricing decision report and the first input data further comprises prevailing interest rates, competitor interest rates, size of account balances, and spread of account balances.

15. The method of claim 9, wherein the computer resources comprise storage availability, memory availability, network availability, and processing availability.

16. The method of claim 9, wherein information report is a regulatory reporting report.

17. A system comprising:
    a database; and
    a computer resource allocation tool comprising a hardware processor, the hardware processor configured to:
    receive a request for an information report, the information report comprising a summary of one or more datasets;
    receive a first dataset for processing from the database, wherein the processing generates, at least in part, the information report and wherein in the processing consumes computer resources of a computer system;
    store the first dataset;
    extract first input data from the first dataset, the first input data comprises parameters for processing the first dataset to produce the information report;
    store the first input data, wherein the second memory is different from the first memory;
    determine an amount of computer resources required to process the first dataset based on, at least in part, the first dataset and the first input data;

determine a computer resource availability for the computer system for each time window of a plurality time windows;

generate first scheduling information based on the amount of computer resources required to process the first dataset and the computer resource availability for one or more time windows, the first scheduling information indicating whether the computer system has the computer resource availability to process the first dataset during the one or more time windows;

generate a scheduling report based on the first scheduling information, the scheduling report indicating the one or more time windows to process the first dataset; and communicate the scheduling report.

18. The system of claim 17, the hardware processor further configured to:

receive a second dataset;

determine an amount of computer resources required to process the second dataset;

determine the computer resource availability for the computer system for each of the plurality of time windows, wherein the determination is based on, at least in part, the first scheduling information; and generate second scheduling information based on the amount of computer resources required to process the second dataset and the computer resource availability of one or more time windows, the second scheduling information indicating whether the computer system has the computer resource availability to process the second dataset during one or more time windows; and update the scheduling report based on the second scheduling information.

19. The system of claim 18, wherein the scheduling report indicates to process first dataset and the second dataset in parallel.

20. The system of claim 17, wherein the computer resources comprise storage availability, memory availability, network availability, and processing availability.

* * * * *